United States Patent [19]
Yano et al.

[11] Patent Number: 5,539,429
[45] Date of Patent: Jul. 23, 1996

[54] TOUCH DEVICE PANEL

[75] Inventors: Haruto Yano; Yoshiaki Hirasa; Toshimichi Tokunaga, all of Hiroshima; Chisato Yoshida, Hyogo; Kazuhiro Yokouchi, Hyogo; Hirofumi Goto, Hyogo; Katsuaki Matsumoto, Hyogo, all of Japan

[73] Assignee: Mitsubishi Denki Kabushiki Kaisha, Tokyo, Japan

[21] Appl. No.: 293,607

[22] Filed: Aug. 22, 1994

Related U.S. Application Data

[63] Continuation of Ser. No. 942,327, Sep. 9, 1992, abandoned, which is a continuation of Ser. No. 602,686, Oct. 24, 1990, abandoned.

[30] Foreign Application Priority Data

Oct. 24, 1989 [JP] Japan ............................... 1-277546

[51] Int. Cl.⁶ ............................... G09G 3/00; G06F 15/50
[52] U.S. Cl. ............................ 345/173; 345/113; 345/146; 395/156; 340/990; 340/995
[58] Field of Search ............................ 345/173, 175, 345/179, 145, 146, 156, 157, 112–116, 121, 123, 172; 395/155, 159, 161, 156, 100; 364/424.05, 943, 449; 348/113, 116; 382/13; 340/988, 990, 995; 353/14

[56] References Cited

U.S. PATENT DOCUMENTS

| | | | |
|---|---|---|---|
| 3,760,360 | 9/1973 | Reynolds et al. | 340/995 |
| 4,477,797 | 10/1984 | Nakagiri | 382/13 |
| 4,511,973 | 4/1985 | Miura et al. | 340/990 |
| 4,521,870 | 6/1985 | Babbel et al. | 340/712 |
| 4,586,035 | 4/1986 | Baker et al. | 340/723 |
| 4,731,769 | 3/1988 | Schaefer et al. | 364/424.05 |
| 4,763,356 | 9/1988 | Day, Jr. et al. | 345/113 |
| 4,766,425 | 8/1988 | Tallman et al. | 340/712 |
| 4,774,671 | 9/1988 | Itoh et al. | 340/988 |
| 4,821,030 | 4/1989 | Batson et al. | 340/712 |
| 4,890,104 | 12/1989 | Takanabe et al. | 340/995 |
| 4,896,154 | 1/1990 | Factor et al. | 340/990 |
| 4,899,138 | 2/1990 | Araki et al. | 340/707 |
| 4,914,624 | 4/1990 | Dunthorn | 340/712 |
| 4,931,783 | 6/1990 | Atkinson | 340/710 |
| 4,941,123 | 7/1990 | Thompson | 395/100 |
| 4,963,865 | 10/1990 | Ichikawa et al. | 340/990 |
| 4,992,947 | 2/1991 | Nimura | 364/449 |
| 4,994,974 | 2/1991 | Cummings | 364/449 |

FOREIGN PATENT DOCUMENTS 33-99715 6/1958 Japan.

Primary Examiner—Steven Saras

[57] ABSTRACT

A touch panel device for navigation of a vehicle for example an automobile. There is a display unit with a screen, and information display for visually representing desired information on the screen. A switch superimposes a switch pattern over the information on the screen and executing a predetermined control action when an operator's finger approaches the switch pattern. To remove the switch pattern after the lapse of a preset time form the visual representation of the switch pattern, erasing is used. The erasing can be accomplished for example by the actuation of a timer to remove the switch pattern. With the switch pattern removed, the entire information on the screen can be seen wholly without being concealed by the switch pattern.

15 Claims, 6 Drawing Sheets

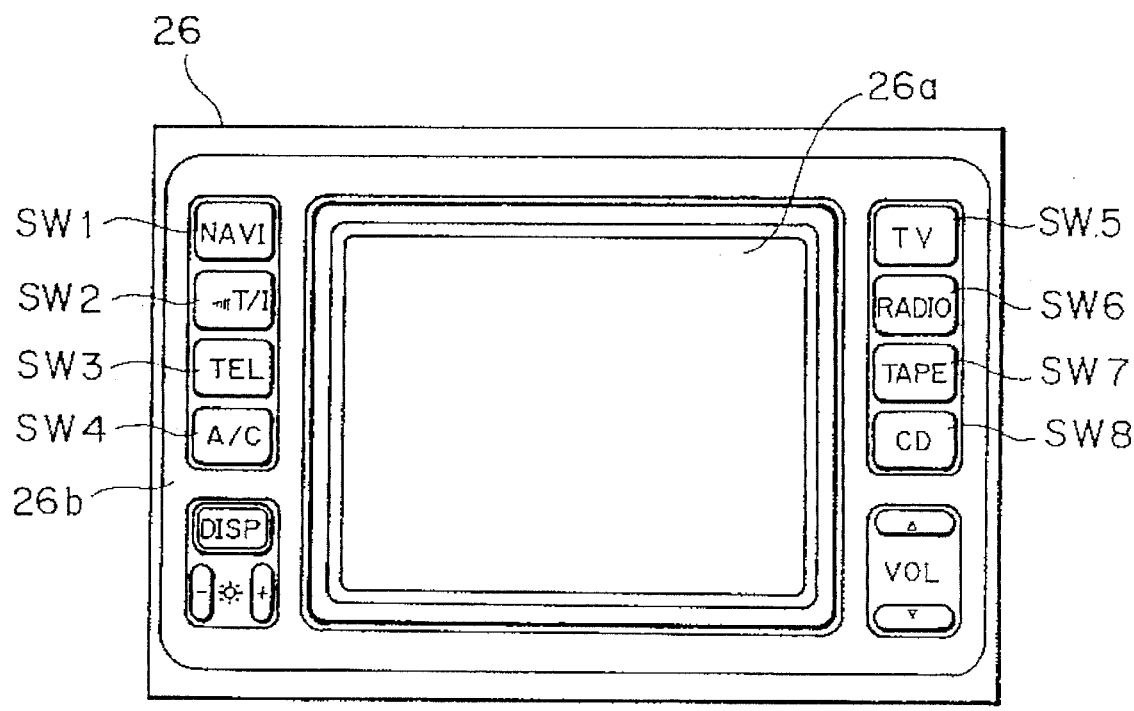
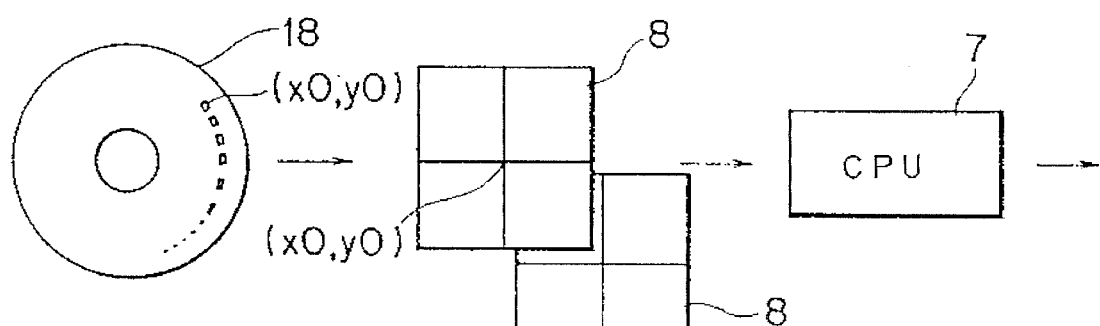
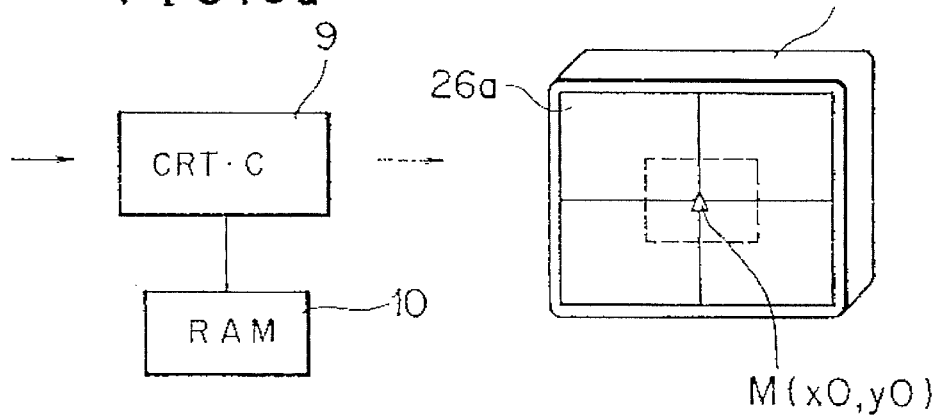

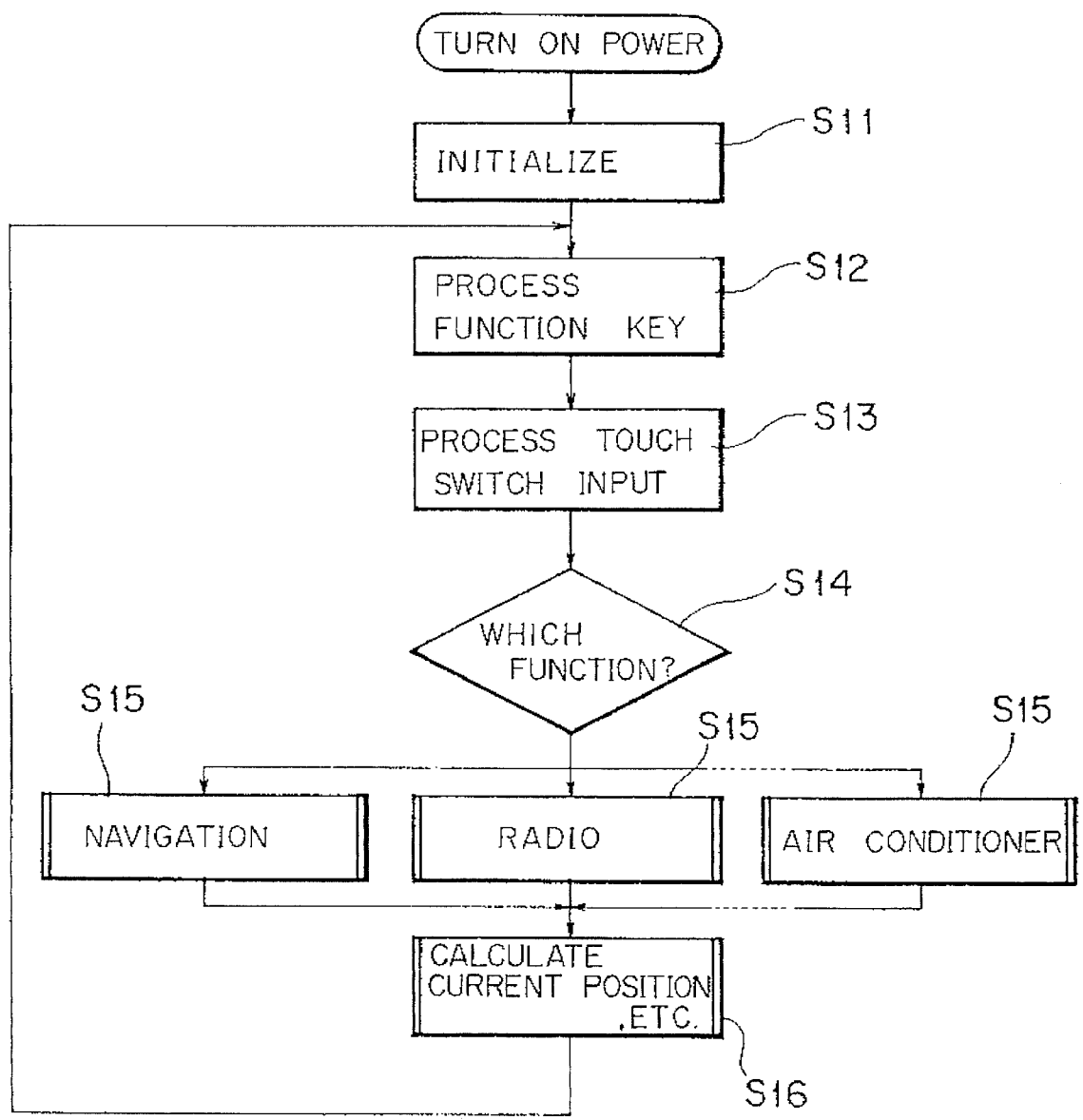

TOUCH DEVICE PANEL

This application is a continuation of application Ser. No. 07/942,327, filed on Sep. 9, 1992, now abandoned, which is a continuation of Ser. No. 07/602,686, filed on Oct. 24, 1990, now abandoned.

BACKGROUND OF THE INVENTION

1. Field of the Invention

The present invention relates to a touch panel device for navigation to be installed in a vehicle such as an automobile, and more particularly to a touch panel device for visually representing, when actuated by an operator's touch, a map, a current position of an automobile, a running locus thereof and so forth on a display unit for example a cathode-ray tube, thereby enabling a driver to acquire necessary information for navigation.

2. Description of the Prior Art

A navigation device installed in a vehicle such as an automobile is generally so contrived that map information inclusive of a whole country map and a plurality of divided district maps are stored in a map memory means any desired map information is read out therefrom in compliance with the requirement of an operator and then is visually represented on a display unit such as a cathode-ray tube constituting a touch panel device, whereby the necessary map for navigation is obtained to meet the requirement.

In such touch panel device, a television picture can be visually represented on a screen of a display unit, and function keys are arrayed on a front panel of the display unit for selecting a desired function relative to television or navigation. In addition to the known function keys, most of the recent devices are equipped with touch switches which are composed of a pattern of actuation keys displayed on the screen. Regarding the touch switches of such type, it is generally customary that a plurality of areas are formed on the display screen, and when any area is touched by an operator's finger, infrared rays are intercepted to output a driving signal. In the switch pattern for actuation is provided in an inner periphery of the screen.

However, since the switch pattern employed in the touch panel device of such type is visually represented in a predetermined area on the display screen at the time of displaying a desired map or television picture required for navigation, a disadvantage exists that the map or television picture being displayed for navigation is concealed by the switch pattern. Therefore, the view field of the screen is narrowed to consequently raise some problems including deterioration of the visual perceptibility and failure in acquiring necessary information.

SUMMARY OF THE INVENTION

The present invention has been provided in an attempt to solve the problems mentioned. One object is to provide an improved touch panel device which is so constructed that, when a switch pattern is not actuated by a touch within a predetermined time after visual representation of the switch pattern on a screen of a display unit, the switch pattern is erased from the screen to thereby enhance the visual perceptibility of information displayed on the screen.

For the purpose of attaining the above object, the touch panel device of the present invention comprises a display unit having a screen; an information display means for visually representing desired information on the screen; a switch means for superimposing a switch pattern over the information displayed on the screen, then detecting an approach of any object such as an operator's finger within a given range from the switch pattern, and executing a predetermined control action; an erase means for erasing the switch pattern after the lapse of a predetermined time from display of the switch pattern by the switch means; and a switch-pattern display start means for starting the display of the switch pattern by the switch means in response to detection of an approach of any object within the given range from the screen.

According to the present invention, if any object such as an operator's finger for actuating the switch pattern is brought close thereto in a state where the switch pattern is superimposed over the information such as map or television picture visually represented on the screen, a control action is executed by the switch means so that the individual functions are performed correspondingly to the roles assigned previously to the switch pattern.

To switch pattern displayed on the screen is erased after the lapse of a predetermined time without any actuation of the switch pattern. Thus, the visual field of the screen is widened to thereby enable the operator to see the entire information.

The above and other features and advantages of the present invention will become apparent from the following description which will be given with reference to the illustrative accompanying drawings.

BRIEF DESCRIPTION OF THE DRAWINGS

FIG. 2 is a front view of a display unit employed in the embodiment of FIG. 1;

FIGS. 3a through 3e schematically show the structure of the embodiment to explain the principle of operation of the present invention;

FIG. 4 is a flow chart showing the processes of a main routine executed in a control unit;

DESCRIPTION OF THE PREFERRED EMBODIMENT

Hereinafter a preferred embodiment of the present invention will be described with reference to the accompanying drawings.

Figure 1:
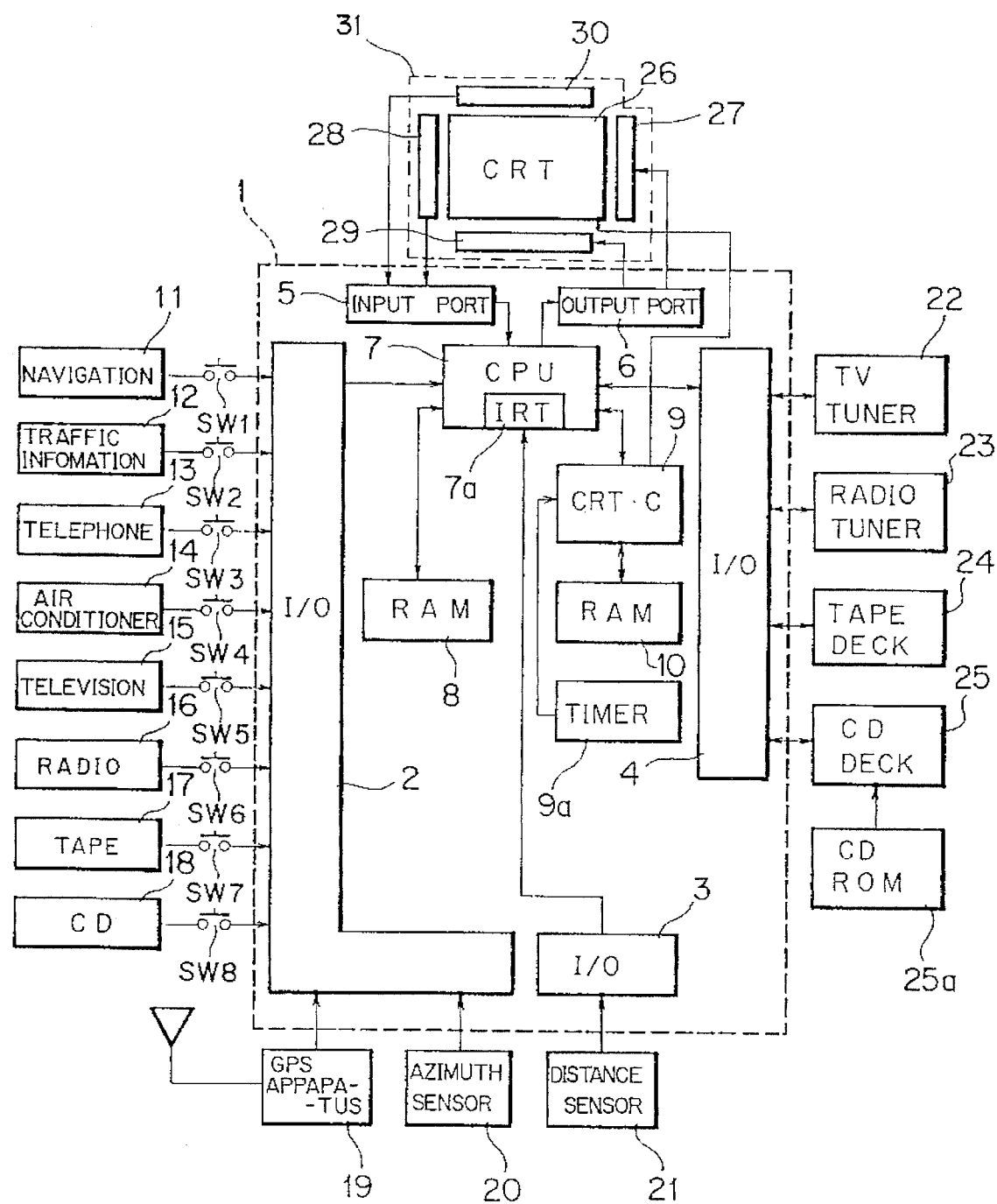
FIG. 1 is a block diagram of an entire apparatus inclusive of a touch panel device embodying the present invention.

FIG. 1 is a block diagram of an entire constitution inclusive of a touch panel device according to the present invention; FIG. 2 is a front view of a display unit employed therein; and FIG. 3 schematically shows the structure of the touch panel device to explain the principle of operation of the present invention.

In FIGS. 1 through 3, reference numeral 1 denotes a control unit having I/O circuits 2, 3, 4, an input port 5 and an output port 6. In the control unit 1, a CPU 7 and a CRT controller 9 (hereinafter referred to as CRT.C) are supplied with a stabilized power obtained via a constant voltage circuit from an automotive battery and function to control various associated apparatus.

Denoted by 2 is a first I/O interface circuit which enables selection of, via function switches SW1–SW8, a desired mode out of navigation 11 for guiding the running of a vehicle, traffic information 12 for receiving information of road state, wireless telephone 13 for automobile, air conditioner 14 for interior air conditioning, television 15, radio 16, tape 17 and CD (compact disc) 18 as video and audio sources. The function switches SW1–SW8 are disposed on a front panel 26b of a CRT 26 shown in FIG. 2 and feed a driving signal to the CPU 7 when pressed to be actuated, thereby operating the associated apparatus. To the first I/O interface circuit 2, there are connected a GPS apparatus 19 which receives radio frequency waves from an artificial satellite via an antenna and is capable of confirming or determining the current position or the running velocity of an automobile; and an azimuth sensor 20 of flux gate type anchored to the vehicle and capable of detecting the earths magnetism by decomposing the same into the running direction component of the vehicle and the vertical component thereof. The sensor 20 then outputs a corresponding signal as a vehicle running azimuth.

Denoted by 3 is a second I/O interface circuit to which a distance sensor 21 is connected. This sensor 21 detects the rotation rate of a vehicle wheel by means of an electromagnetic pickup or reed switch and outputs a pulse signal proportional to the rotation rate. The azimuth sensor 20 and the distance sensor 21 constitute a current position detecting means which is capable of calculating both the current position data of the vehicle and the running locus data thereof.

To a third I/O interface circuit 4, there are connected video and audio appliances such as a television tuner 22, a radio tuner 23, a tape deck 24 and a DC deck 25. The CD deck 25 is furnished with a CD.ROM 25a serving as a map memory means, from which a variety of undermentioned map information and diagram data can be read out and displayed on the CRT 26 at the time of selection of the navigation 11.

The CD.ROM 25a consists of such a map information storage memory as disclosed in Nikkei Electronics, Nov. 26, 1987. In this memory, there are stored various map information inclusive of a whole country map, district maps, region maps and zone maps in the form of vector data. In this embodiment, the information relative to the region maps and the zone maps are classified into three kinds of wide, standard and detailed formats where reduced scales are mutually different in conformity with the display area sizes of the maps to be visually represented on the CRT 26. And such map information are so stored, as to include common portions. The three kinds of map information are divided into a plurality of map blocks in the order from the side format toward the detailed format in such a manner as to attain optimum visual representation of the map information in the individual reduced scales, and the data thus obtained are sequentially stored in the CD.ROM 25a. Such stored map information include roads, rivers and bridges decomposed into diagram data, and also other data such as characters and symbols, service data relative to hotels, golf links and so forth, and further dot pattern data for shading the display screen. With regard to the individual items such as roads, rivers, bridges and so forth, visual representation is effected by color codes selected out of a color code table for a color pallet which consists of a plurality of color codes (e.g., 16 colors). For enabling visual representation of the same item in different colors, several kinds of color code tables for color pallets are stored in the memory.

Reference numeral 7 denotes a CPU (central processing unit) which controls the operations of the video and audio appliances in accordance with selective actuation of the function switches SW1–SW8 while reading out the map information and so forth from the CD.ROM 25a and feeds a control signal to the CRT-C 9 for displaying the information on the screen 26a of the CRT 26. Furthermore, the CPU 7 executes the required processes in response to a pulse signal received from the distance sensor 21 via the IRT (interrupt) circuit 7a, a GPS input data signal from the GPS apparatus 19, and an azimuth signal of X and Y components from the azimuth sensor 20, thereby calculating the current position. The CPU 7 samples such position data periodically at an interval of a predetermined time or distance, and stores the sampled data as a running locus. In addition, the CPU 7 feeds a control signal to the CRT controller 9 for displaying the sampled data together with the map information.

Denoted by 8 is a RAM serving as a temporary memory means. As shown typically in FIG. 3, the data read out from the CD.ROM 25a during the process of the CPU 7 is temporarily stored in this RAM 8 which is supplied with a backup power continuously from an automotive battery so as to hold the stored data. The map information required for displaying the map while placing the coordinates $X_0$, $Y_0$ of the current position at the center of the screen 26a is read out from the CD.ROM 25a in accordance with the displacement of the current position and then is stored in the RAM 8. The RAM 8 further has a memory table for storing the above position data so as to display the running locus on the screen 26a of the CRT 26. In this embodiment, a plurality of endless memory tables are prepared correspondingly to the map information of different reduced scales stored in the CD.ROM 25a.

Reference numeral 9 denotes a CRT.C (CRT controller) serving as an information display means which, in response to a display control command from the CPU 7, exhibits the map information (such as diagram data and characters), the current position mark M, the running locus and so forth to the display RAM 10 while outputting a video signal and a synchronizing signal for displaying such information on the CRT 26. The CPU 7 reads, from the memory tables in the RAM 8, the desired map information on one specified scale out of the entire map information of the wide, standard and detailed formats stored in the CD.ROM 25a, and also reads the running locus information relative to such map information, and then superimposes the running locus over the diagram on the map.

Denoted by 9a is a timer serving as an erase means which is placed in operation to erase the switch patterns S1–S4, W1, W2 upon lapse of a preset time (5 seconds in this example) after visual representation of the switch patterns S1–S4, W1, W2 achieved on the display screen 26a by selective actuation of an undermentioned touch switch 31 serving as a switch means Reference numeral 10 denotes a display RAM where the map information (diagram data, character data, etc.), the current position mark M, the running locus and so forth are exhibited to be outputtable as video signals. Furthermore, pattern data are also stored in the RAM 10 so as to display, on the screen 26a, actuation keys in the form of a touch switch pattern for driving the above-described apparatus.

Figure 11:
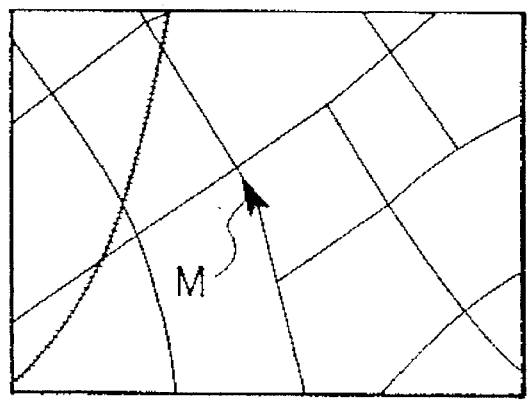
FIG. 11 illustrates a display screen where a map alone is visually represented.

Such pattern data include the current position mark M (FIG. 3) represented by a triangle on the screen 26a of the CRT 26; a locus touch switch pattern for feeding to the CPU 7 a switching signal which selects either display or non-display of the running locus; a scroll key pattern composed of S1–S4 to constitute a map shift means for shifting the map displayed on the screen 26a as shown in FIG. 11; an unshown correction pattern serving as a correct position mark display means for correcting the position of the current position mark M being displayed on the screen 26a; a return pattern serving as a map shift return means for returning the shifted map to the former position thereof; and an enlarge pattern and a reduce pattern for selecting a desired scale of each map as shown in FIG. 11.

Denoted by 26 is a CRT serving as a display unit where the map of any specified zone, the running route and the current position therein are visually represented in colors by the video signals and the synchronizing signal obtained from the CRT.C 9. Moreover, actuation keys of an undermentioned touch switch section are displayed in a predetermined touch area. And a television picture can also be displayed when the television tuner 22 is turned on by pressing the function switch SW5.

There are further shown light emitting elements 27, 29 connected to the CPU 7 via the output port 6; and light receiving elements 28, 30 connected to the CPU 7 via the input port 5. These elements are disposed on the surface of the CRT 26 and constitute a touch panel of the touch switch 31 serving as a switch means. Although not shown, a multiplicity of partial touch areas are arrayed to form rows and columns on the touch panel, and when any one of such touch areas is actuated by a touch, infrared rays passing through the intersections of the rows and the columns are intercepted, so that a driving signal for giving various instructions is outputted. More specifically, when the screen 26a is touched, the actuation patterns are displayed in the inner periphery of the screen 26a. And the start or halt of each apparatus and the operation time or numerical value relative thereto can be set by touching one of such patterns.

Figure 9:
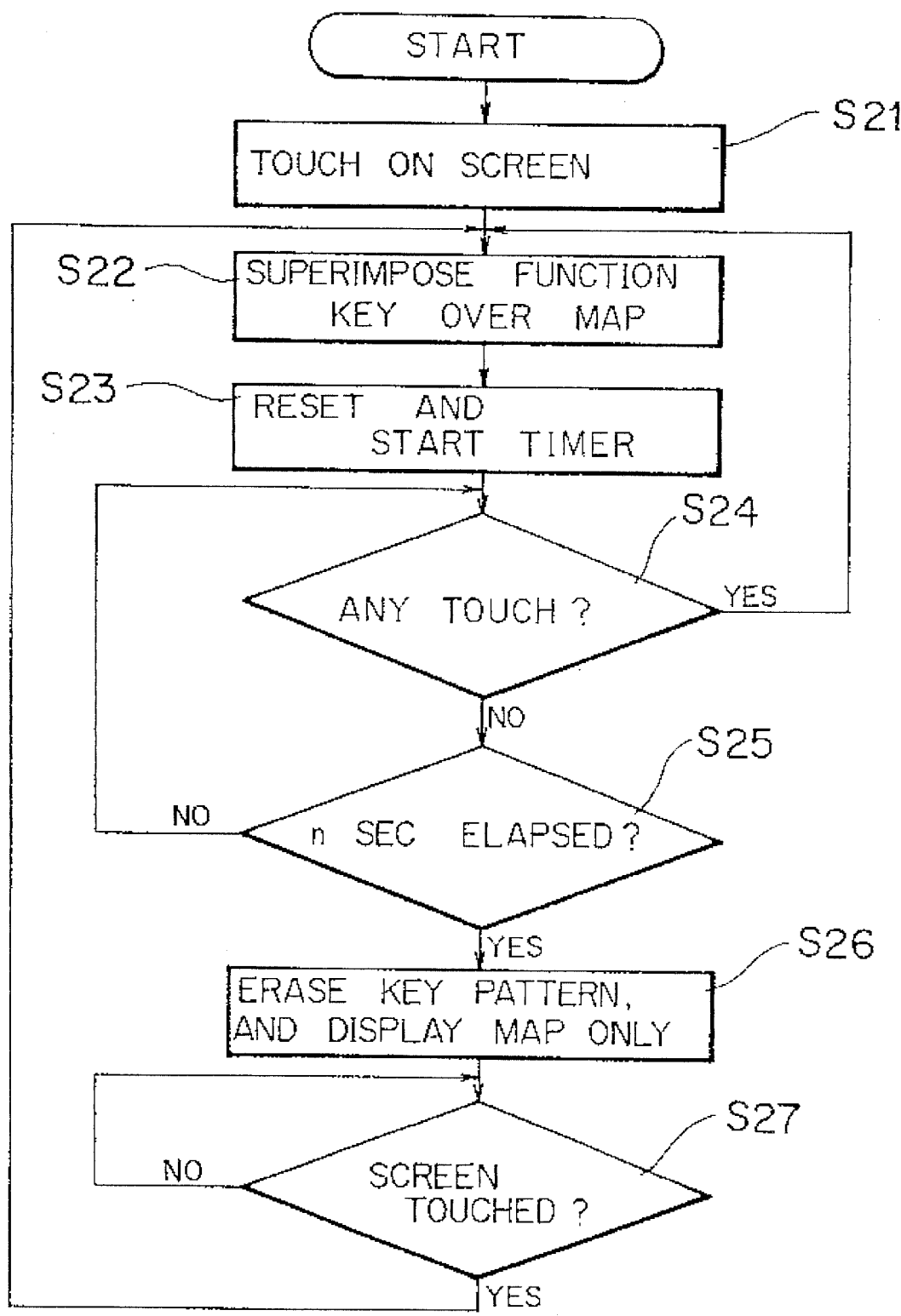
FIG. 9 is a flow chart showing the processes for visual representation of a switch pattern in a navigation mode.

Referring now to the flow charts of FIGS. 4 and 9, a description will be given on the operation of the touch panel device constituted as mentioned above.

Figure 5:
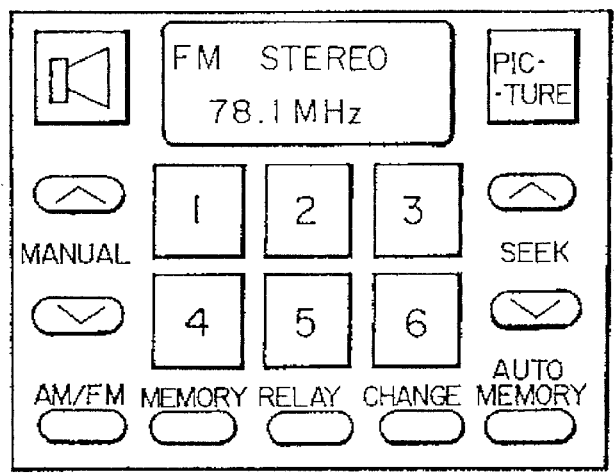
FIGS. 5 through 7 illustrate various menus visually represented on a screen of a display unit.
Figure 6:
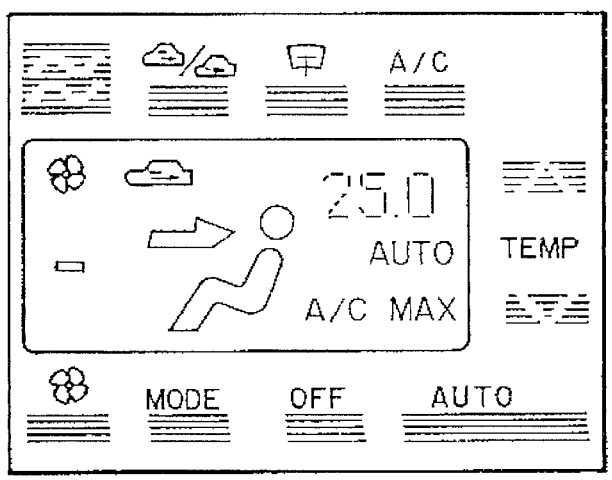

When a key switch is turned on to start an automobile, its electric systems are supplied with a required power from an automotive battery and are thereby placed in operation. And when the CPU 7 in the control unit 1 is switched on to be energized by a stabilized power, the operation is started to first execute initialization in step S11 in the flow chart of FIG. 4. The processes of the main routine shown in this flow chart are repeated periodically in a cycle of several 10 msec. Subsequently the function key process is executed in step S12, and then the touch switch input process is executed in step S13. In this stage, if the operator presses the function switch SW6 or SW4 for example to actuate the radio 16 or the air conditioner 14 in step S14, the process proceeds to step S15 so that the pattern of the radio mode shown in FIG. 5 or the pattern of the air conditioner mode shown in FIG. 6 is displayed on the screen 26a of the CRT 26. And when one of the switch patterns provided on the display screen for the individual modes is touched, the selected apparatus can be driven in accordance with the desired setting. And even during such operation, the process proceeds to step S16 where the CPU 7 executes a calculation of the current position.

Next a description will be given with regard to the operation performed in the navigation mode.

Figure 7:
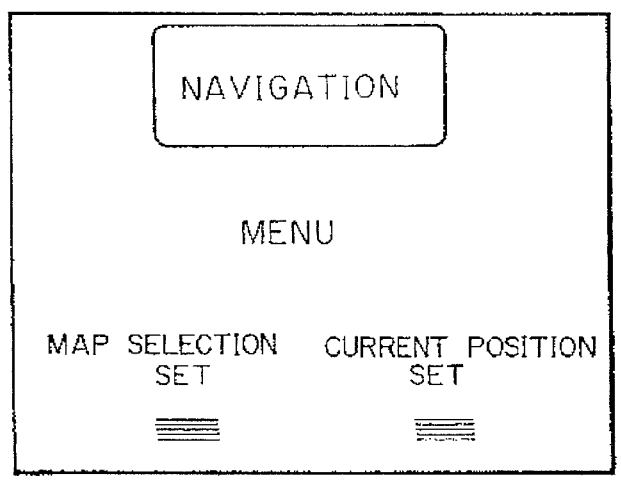
Figure 8:
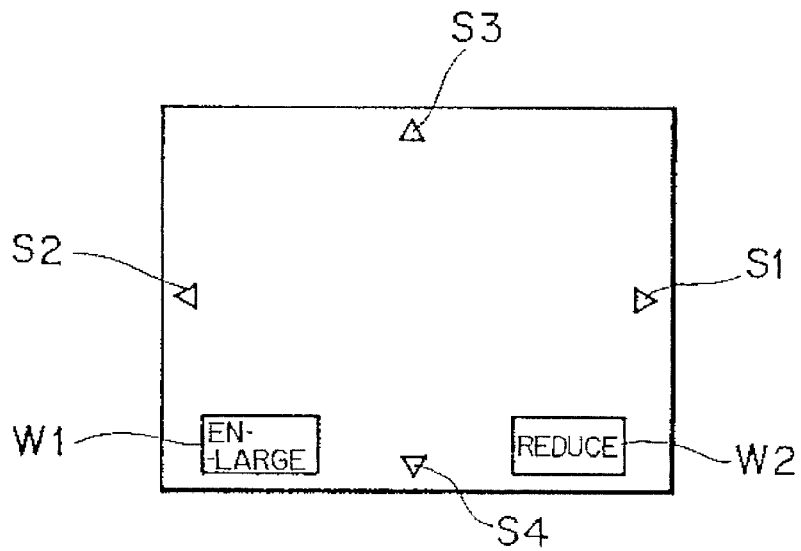
FIG. 8 illustrates an exemplary switch pattern visually represented on a screen of a display unit.
Figure 10:
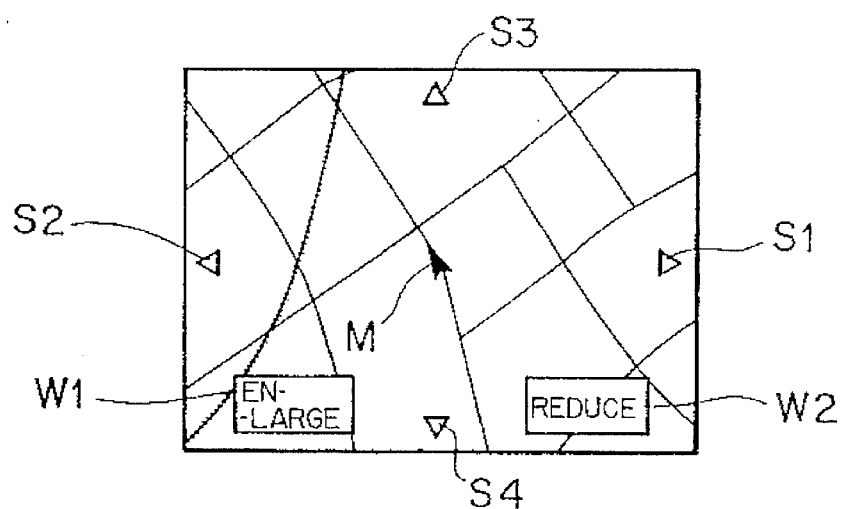
FIG. 10 illustrates a display screen where a map and a switch pattern are visually represented.

First the function switch SW1 is pressed to actuate the navigation 11. Then, on the screen 26a of the CRT 26, there is displayed a navigation menu with setting patterns for map selection and current position as illustrated in FIG. 7.

When either of such setting patterns is touched, the map information and the diagram data are read out from the CD.ROM 25a, while the current position data is read out from the temporary storage RAM 8. Then the road map and the road-railway diagram are displayed on the screen 26a, and also the current position mark M indicative of the current position of the automobile is displayed on the road diagram. (The visual representation on the display screen is illustrated in FIG. 11). Therefore the driver can obtain the map information required for the navigation.

When shifting the displayed map or replacing the same with some other map on a different scale, it is necessary to display the setting switch patterns S1–S4, W1, W2 on the screen. The operation in this case is performed in conformity with the procedure shown in the flow chart of FIG. 9.

First, a portion of the screen 26a is touched by an object which is an operator's finger in this case (step S21). Then a detection signal is outputted from the touch switch 31. As a result, patterns of the scroll keys S1–S4 and the enlarge and reduce switches W1, W2 are superimposed over the map on the screen 26a. At this instant, the timer 9a is reset to start counting the time. Thereafter the process proceeds to step S24, where a decision is made as to whether any of the switch patterns S1–S4, W1, W2 is touched or not. If the result of the decision signifies the presence of a touch, the operation corresponding thereto is started. For example, if one of the scroll keys S1–S4 is touched, the map on the screen 26a is scrolled in the designated direction. Meanwhile, when the enlarge switch pattern W1 or the reduce switch pattern W2 is touched, one of the wide, standard and detailed maps is displayed.

Contrary to the above example, if none of the switch patterns S1–S4, W1, W2 is touched, a decision is made as to whether a preset time (5 seconds in this example) has elapsed or not. In case an actuating touch is existent within such preset time, a further decision is made as to whether a touch is existent again or not after that instant. And upon lapse of 5 seconds in a state without any touch, the preset time expires so that the switch pattern S1–S4, W1 or W2 being displayed is erased from the screen 26a. Consequently the map alone is displayed on the screen 26a as illustrated in FIG. 11 (step S26), and therefore the operator can watch only the map after a short time of 5 seconds from visual representation of the switch pattern S1–S4, W1 or W2 on the screen 26a. Thus, the map displayed on the screen 26a is not concealed by any of the switch patterns S1–S4, W1, W2, thereby enabling the operator to see even the details of the map without fail.

If any one portion of the screen 26a is touched again in step S27 which corresponds to a switch pattern start means, the switch patterns S1–S4, W1, W2 are displayed on the screen 26a (step S22), so that the next selective actuation can be performed immediately.

The description given above is concerned with an exemplary operation mode relative to the navigation 11. And when a television picture is displayed on the screen 26a, the same actuation as mentioned can be performed as well.

As described hereinabove, the timer 9a serves to erase the switch patterns S1–S4, W1, W2 from the screen 26a after the lapse of a preset time. Therefore, when both a map and the switch patterns S1–S4, W1, W2 are displayed on the screen 26a in the navigation mode, merely the switch patterns S1–S4, W1, W2 can be erased after the lapse of a preset time (5 seconds). Accordingly, the entirety of the displayed map can be seen on the screen 26a without any concealed portion to consequently eliminate failure in watching the details.

According to the present invention, when any switch pattern is superimposed over desired information being represented visually on the screen of the display unit by the information display means, a predetermined control action can be executed by approach of an actuating object such as an operator's finger to the switch pattern being displayed. Furthermore, if the switch pattern is not actuated within a preset time after visual representation thereof on the screen, such switch pattern can be erased from the screen. Consequently it becomes possible to display merely the required information alone on the screen, hence enabling the operator to watch the entire information which is otherwise concealed partially by the switch pattern. In addition, there is achievable another advantage that, if an object such as an operator's finger for actuation is brought close to the screen again, the switch pattern can be displayed again on the screen, so that selective actuation for attaining a desired operation is rendered possible with facility.

What is claimed is:

1. A vehicle touch panel device comprising:

a display unit having a screen;

means for visually representing information on said screen said information related to navigational information of the vehicle;

switch means for superimposing a predetermined switch pattern over the visually represented information on said screen and executing a predetermined control action upon detection of approach of an object within a given range from said pattern;

erase means for erasing said switch pattern by the lapse of a preset time after the visual representation of said switch pattern by said switch means if no further actuation of the switch pattern occurs during the preset time; and switch pattern display start means for making said switch means start visual representation of the switch pattern in response to detection of approach of an object within a given range from said screen, so that said predetermined switch pattern can be displayed on the screen after said switch pattern has been displayed and erased.

2. A vehicle touch panel device as claimed in claim 1, wherein said screen is a cathode ray tube.

3. The vehicle touch panel device of claim 1, further comprising:

restarting means for restarting the lapse of the preset time by said erase means in response to detection of approach of an object within a given range from said screen.

4. A touch panel apparatus for use in a vehicle comprising:

display means for visually displaying sequentially a plurality of modes of navigational information associated with a vehicle;

switch means for superimposing a predetermined switch pattern by touch and approach over the information visually represented on said screen and executing a predetermined control action upon detection of approach of an object within a given range from said pattern;

erase means for erasing said switch pattern solely by the lapse of a preset time after the visual representation of said switch pattern by said switch means if no further actuation of the switch pattern occurs during the preset time; and switch pattern display actuation means for actuating said switch pattern display in response to detection of approach of an object within a given range from said screen, so that said predetermined switch pattern can be displayed.

5. The touch panel apparatus of claim 4, wherein one of said plurality of navigational modes of information includes navigation information for representing the location of the vehicle on the display means.

6. The touch panel apparatus of claim 5, wherein said navigation information includes a map.

7. The panel apparatus of claim 6, wherein said switch pattern upon actuation can control visual movement and size of said map.

8. The touch panel apparatus of claim 7, wherein said switch pattern included means for scrolling the map.

9. The touch panel apparatus as claimed in claim 7, wherein said switch pattern includes means for enlarging or reducing the size of the map on the display means.

10. The touch panel apparatus of claim 5, wherein said means for erasing is a timer.

11. A touch panel apparatus for use in a vehicle as claimed in claim 4, wherein said display means is a cathode ray tube.

12. A touch panel apparatus for use in a vehicle as claimed in claim 4, wherein said touch panel is installed in a vehicle.

13. The vehicle touch panel device of claim 4, further comprising:

restarting means for restarting the lapse of the preset time by said erase means in response to detection of approach of an object within a given range from said screen.

14. A vehicle including a touch panel device comprising:

a display unit having a screen;

means for visually representing information on said screen said information related to navigational information of the vehicle;

switch means for superimposing a predetermined switch pattern over the visually represented information on said screen and executing a predetermined control action upon detection of approach of an object within a given range from said pattern, said superimposed switch pattern partially visually obscuring the represented information;

erase means for erasing said switch pattern from the screen after a lapse of a preset time if no further actuation of the switch pattern occurs during the preset time, so that the represented information is not obscured; and switch pattern display actuation means for actuating said switch means to start visual representation of the switch pattern in response to detection of approach of an object within a given range from said screen, so that said predetermined switch pattern can be displayed on the screen.

15. The vehicle touch panel device of claim 14, further comprising:

restarting means for restarting the lapse of the preset time by said erase means in response to detection of approach of an object within a given range from said screen.

* * * * *